US011588627B2

(12) United States Patent
Islam et al.

(10) Patent No.: US 11,588,627 B2
(45) Date of Patent: *Feb. 21, 2023

(54) SYSTEMS AND METHODS FOR UTILIZING QUANTUM ENTROPY IN SINGLE PACKET AUTHORIZATION FOR SECURE NETWORK CONNECTIONS

(71) Applicant: Verizon Patent and Licensing Inc., Basking Ridge, NJ (US)

(72) Inventors: Junaid Islam, San Jose, CA (US); William F. Copeland, Garland, TX (US); Mohammed M. Rahman, Allen, TX (US); Gina L. Otts, Flower Mound, TX (US); Brent R. Bilger, Los Altos Hills, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 5 days.

This patent is subject to a terminal disclaimer.

(21) Appl. No.: 17/443,959

(22) Filed: Jul. 29, 2021

(65) Prior Publication Data

US 2021/0359849 A1 Nov. 18, 2021

Related U.S. Application Data

(63) Continuation of application No. 16/699,354, filed on Nov. 29, 2019, now Pat. No. 11,095,440.

(51) Int. Cl.
*H04L 9/08* (2006.01)
*H04L 9/06* (2006.01)
*H04L 9/32* (2006.01)

(52) U.S. Cl.
CPC .............. *H04L 9/0852* (2013.01); *H04L 9/06* (2013.01); *H04L 9/0869* (2013.01); *H04L 9/3228* (2013.01)

(58) Field of Classification Search
CPC ... H04L 9/0852; H04L 9/0816; H04L 9/0861; H04L 9/0863; H04L 9/0869; H04L 9/0838
See application file for complete search history.

(56) References Cited

U.S. PATENT DOCUMENTS 8,156,338 B1  4/2012  Morris
8,413,248 B2 * 4/2013  Rash ...................... H04L 63/02
                                              726/25

(Continued)

OTHER PUBLICATIONS

Michael Rash, "Single Packet Authorization", 11 pages, published: Apr. 1, 2007. (Year: 2007).*

(Continued)

*Primary Examiner* — Ponnoreay Pich

(57) ABSTRACT

A device may receive, from a client device, a request with a single packet authorization (SPA) packet that includes data identifying a universal client device identifier. The device may generate a shared key associated with the universal client device identifier, and may determine that the SPA packet matches a comparison message authentication code (MAC) generated based on the shared key. The device may provide, based on the SPA packet matching the comparison MAC, a MAC associated with the SPA packet to the client device to enable the client device to validate the device.

20 Claims, 14 Drawing Sheets

100 ⟶

Client devices
105

Receive client device data identifying client devices associated with a server device ⟶

Server device
110

(56) References Cited

U.S. PATENT DOCUMENTS

| | | | |
|---|---|---|---|
| 2002/0199102 A1* | 12/2002 | Carman | H04L 9/083 |
| | | | 713/168 |
| 2003/0233539 A1* | 12/2003 | Tardo | H04L 9/0838 |
| | | | 713/153 |
| 2006/0117175 A1 | 6/2006 | Miura et al. | |
| 2007/0234428 A1* | 10/2007 | Rash | H04L 63/02 |
| | | | 726/25 |
| 2008/0031456 A1 | 2/2008 | Harrison et al. | |
| 2013/0019105 A1 | 1/2013 | Hussain | |
| 2015/0318998 A1* | 11/2015 | Erlikhman | H04L 63/0853 |
| | | | 713/171 |
| 2016/0127903 A1* | 5/2016 | Lee | H04W 36/0038 |
| | | | 713/168 |
| 2020/0154278 A1 | 5/2020 | Douglas et al. | |
| 2020/0403787 A1 | 12/2020 | Islam et al. | |
| 2021/0359849 A1* | 11/2021 | Islam | H04L 9/06 |

OTHER PUBLICATIONS

Vassilev et al, "Entropy as a Service: Unlocking Cryptography's Full Potential", 5 pages, published; Sep. 2016. (Year: 2016).*

* cited by examiner

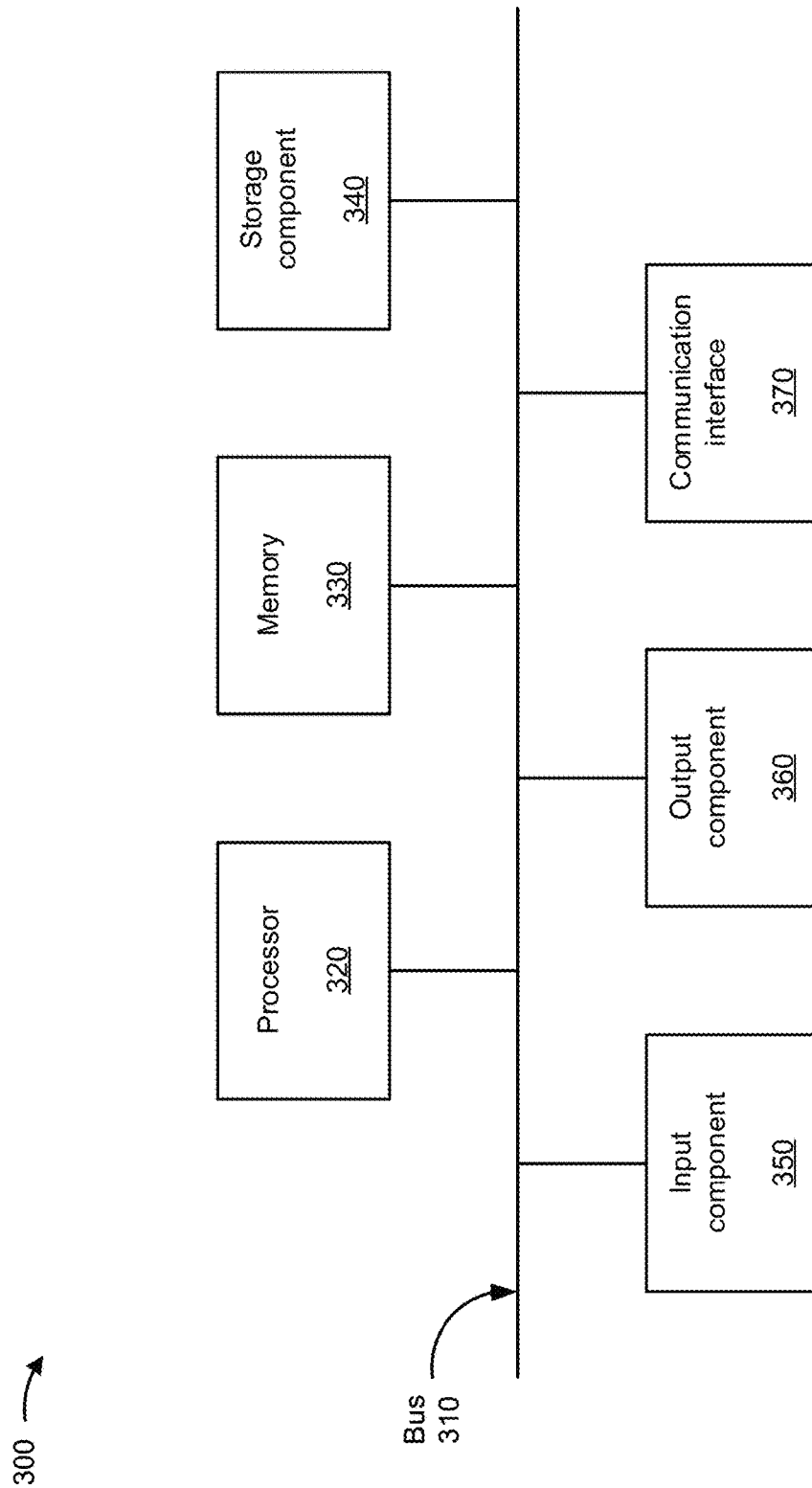

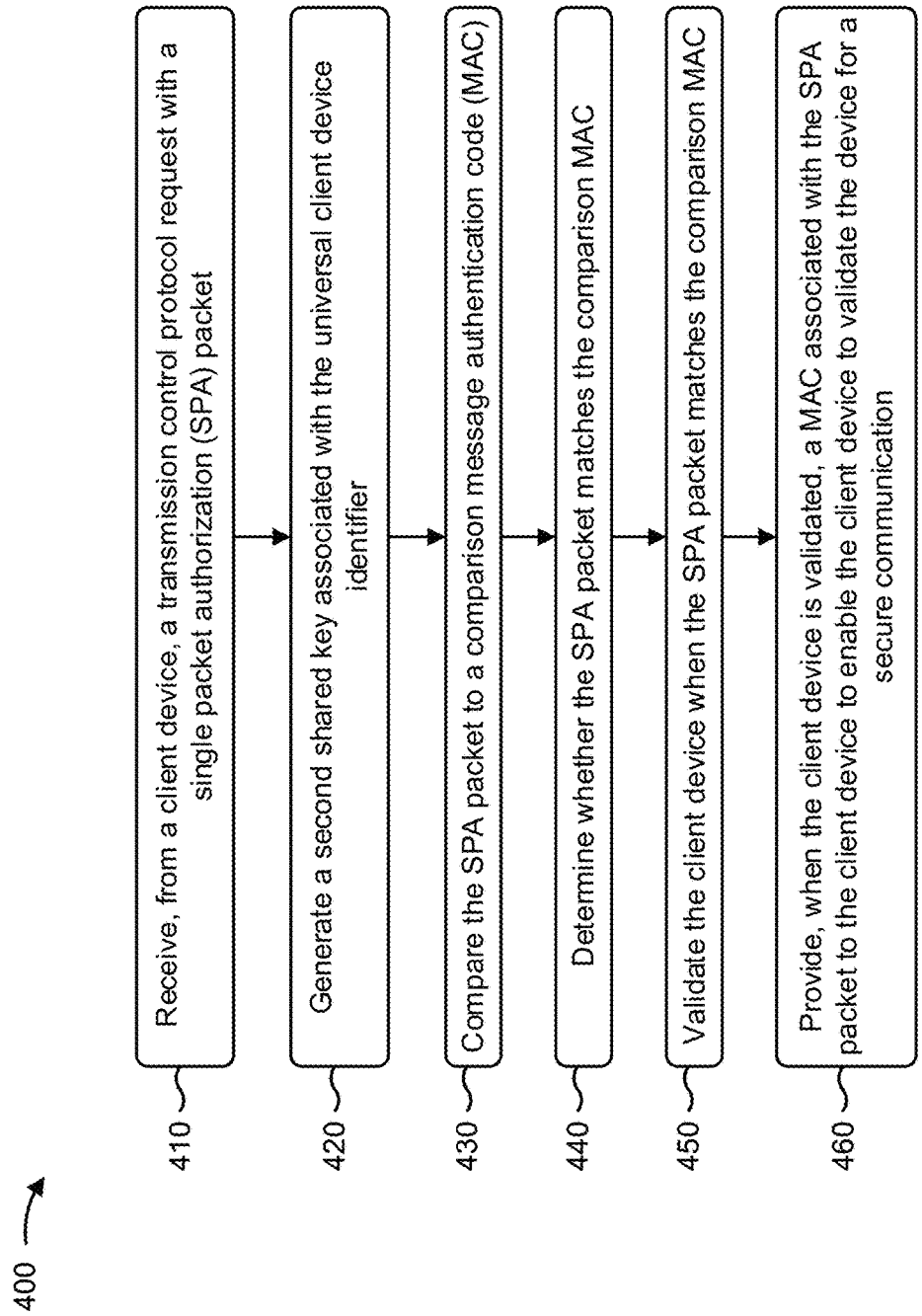

US 11,588,627 B2

SYSTEMS AND METHODS FOR UTILIZING QUANTUM ENTROPY IN SINGLE PACKET AUTHORIZATION FOR SECURE NETWORK CONNECTIONS

RELATED APPLICATION

This application is a continuation of U.S. patent application Ser. No. 16/699,354 (now U.S. Pat. No. 11,095,440), entitled "SYSTEMS AND METHODS FOR UTILIZING QUANTUM ENTROPY IN SINGLE PACKET AUTHORIZATION FOR SECURE NETWORK CONNECTIONS," filed Nov. 29, 2019, which is incorporated herein by reference in its entirety.

BACKGROUND

Network security is the process of taking physical and software preventative measures to protect a network infrastructure from unauthorized access, misuse, malfunction, modification, destruction, improper disclosure, and/or the like. Network security creates a secure platform infrastructure for computing devices, users, software programs, and/or the like to perform functions within a secure environment.

BRIEF DESCRIPTION OF THE DRAWINGS

FIG. 3 is a diagram of example components of one or more devices of FIG. 2.

FIG. 4 is a flow chart of an example process for utilizing quantum entropy in single packet authorization for secure network connections.

DETAILED DESCRIPTION OF PREFERRED EMBODIMENTS

Figure 1A:
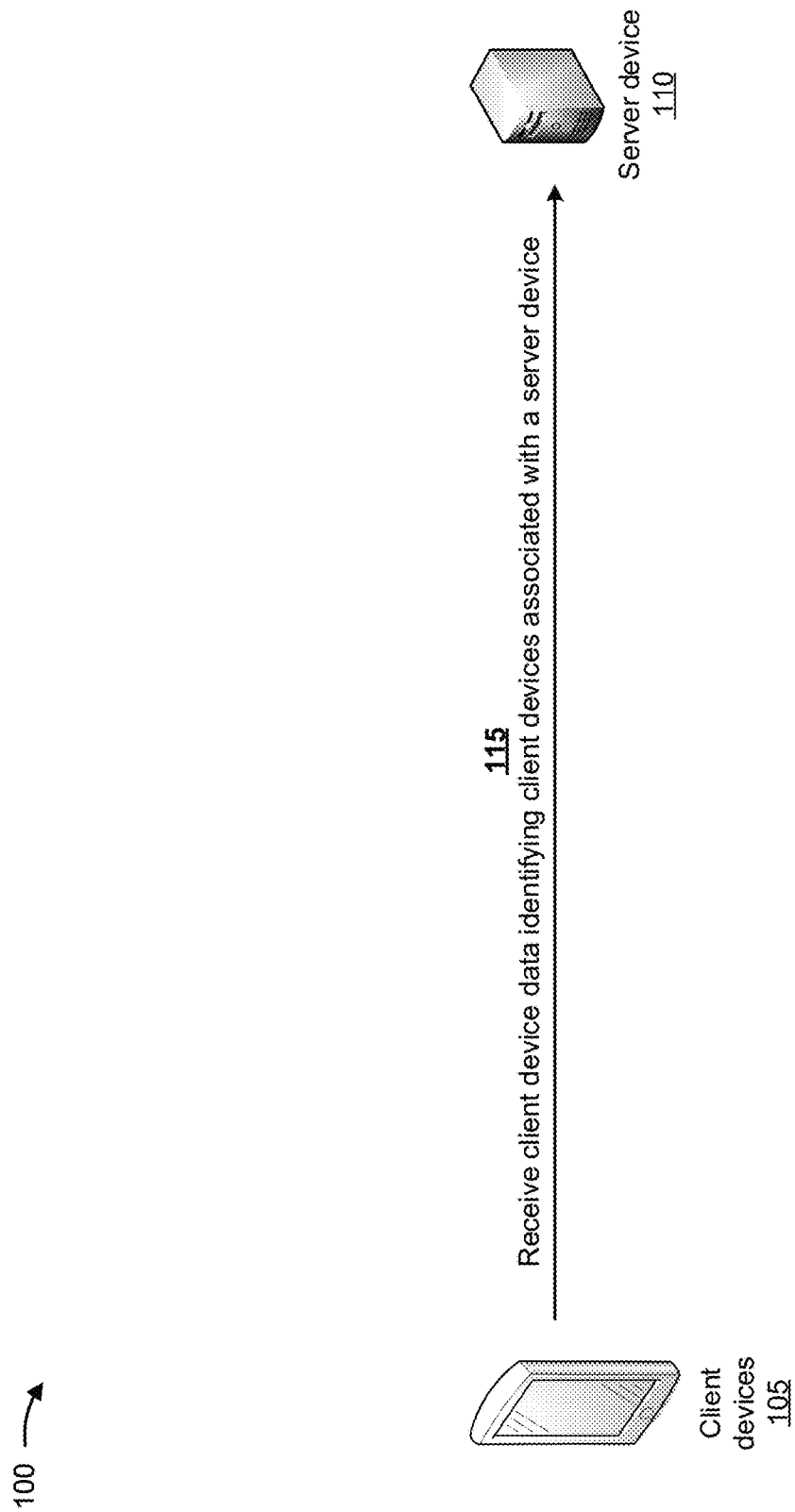
FIGS. 1A-1K are diagrams of one or more example implementations described herein.

The following detailed description of example implementations refers to the accompanying drawings. The same reference numbers in different drawings may identify the same or similar elements.

Transport layer security (TLS) provides secrecy and integrity for data transmitted between client devices and server devices, over an untrusted network, via cryptography. TLS also provides authentication of the server device and, optionally, authentication of the client device prior to encryption of the data. Authentication of the server device may be critical to a protocol using TLS and to preventing man-in-the-middle attacks on the secrecy and the integrity of the data. Currently, TLS authentication is performed using a Rivest Shamir Adleman (RSA) Public-Key Cryptography Standards (PKCS) 1.5 protocol or a Digital Signature Standard (DSS) protocol. Both protocols use public key encryption based on an assumption that it is difficult to factor large numbers efficiently. However, a relatively new technology called quantum computing is believed to be able to factor large numbers quickly, thus defeating authentications of both the RSA PKCS 1.5 protocol and the DSS protocol and exposing data to malicious parties.

In addition to the full compromise of the public key cryptography, both of the RSA PKCS 1.5 protocol and the DSS protocol require a server device to consume random numbers generated by an operating system of the server device in order to perform authentication of the server device. However, malicious parties are able to consume a significant amount of randomness generated by a server device, such that the malicious parties are able to derive keys being used for data encryption post a public key handshake. Furthermore, both of the RSA PKCS 1.5 protocol and the DSS protocol require large quantities of computing power to perform algorithms, which places limitations on a quantity of connections that a server device can perform in a particular period of time. The RSA protocol and the DSS protocol utilize a certificate for server device authentication and a user name and password for client authentication. Unfortunately, user names and/or passwords get compromised.

Some implementations described herein provide a security protocol that utilizes quantum entropy in single packet authorization (SPA) for secure network connections. In this way, the server device and the client device utilize a security protocol that provides quantum entropy in SPA for secure network connections. The security protocol (e.g., an SPA protocol) may provide network connections that are quantum computer safe (e.g., cannot be deciphered by a quantum computer). The SPA protocol enables generation of SPA packets that are enhanced by a quantum-driven entropy (e.g., lack of order or predictability) that provides a secure end-to-end cryptographic system for communications between client devices and server devices. The SPA packets enable a server device to definitively authenticate a client device attempting to connect to the server device. The SPA protocol is lightweight, which enables the SPA protocol to defeat distributed denial of service (DDoS) attacks by immediately terminating failed authentications.

For example, with the security protocol, the server device may provide, to the client device, data that can only be generated by the server device. The client device may verify that the data could only be generated by the server device. Furthermore, the client device may provide, to the server device, data that can only be generated by the client device. The server device may verify that the data could only be generated by the client device. Both the client device and the server device may generate an encryption key from two sets of data in a way that a malicious party cannot recreate the encryption key by observing a transfer of data between the client device and server device. The security protocol also enables performance of server authentication without consuming significant randomness, without consuming significant computing resources (e.g., such that the server device may handle more client device connections in a particular time period), and/or like. The security protocol also provides perfect forward secrecy. Thus, the security protocol conserves computing resources (e.g., processing resources, memory resources, communication resources), networking resources, and/or the like that would otherwise be wasted in monitoring network security issues, correcting network security issues discovered during monitoring, handling loss of data or network inoperability due to the network security issues, and/or the like.

FIGS. 1A-1K are diagrams of one or more example implementations 100 described herein. As shown in FIG. 1A, client devices 105 may be associated with a server device 110. Client devices 105 may include mobile devices, computers, telephones, set-top boxes, and/or the like that the users may utilize to interact with and/or retrieve information from server device 110. In some implementations, client devices 105 and server device 110 may utilize a security protocol (e.g., an SPA protocol) that provides quantum entropy in SPA for secure network connections between client devices 105 and server device 110.

As further shown in FIG. 1A, and by reference number 115, server device 110 may receive, from client devices 105, client device data identifying client devices 105 associated with server device 110. In some implementations, the client device data may include data identifying users of client devices 105, accounts associated with the users, identifiers associated with client devices 105 (e.g., mobile equipment identifiers (MEIDs), international mobile equipment identities (IMEIs), and/or the like), and/or the like. In some implementations, server device 110 may continuously receive the client device data, may periodically receive the client device data, may receive the client device data upon request, and/or the like. In some implementations, server device 110 may store the client device data in a data structure (e.g., a database, a table, a list, and/or the like) associated with server device 110.

Figure 1B:
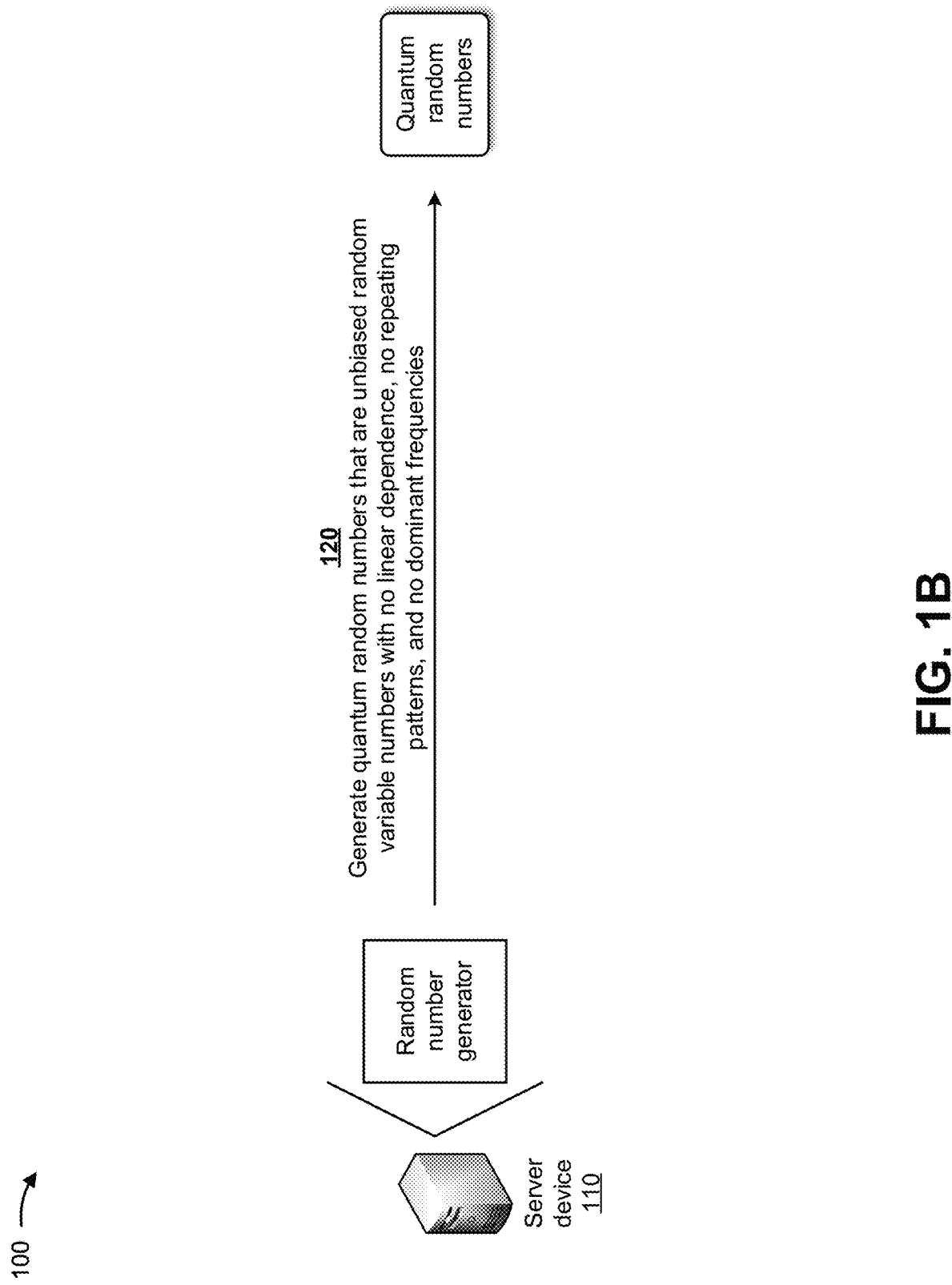

As shown in FIG. 1B, and by reference number 120, server device 110 may generate quantum random numbers. In some implementations, the quantum random numbers may include unbiased random variables with correct ones and zeros densities, may not include linear dependence when viewed as a matrix, may not include repeating patterns, may not include dominant frequency when examined with a discrete Fourier transform, and/or the like. In some implementations, the quantum random numbers may be undecipherable by a quantum computer, may include independent, identically distributed binary data that is ideal for use as encryption keys, and/or the like.

In some implementations, server device 110 may include multiple random number generators that generate multiple random numbers. The multiple random number generators may operate in parallel to produce a volume of random numbers with entropy greater than a predetermined threshold, the numbers being consumed by encryption key generators. The inclusion of multiple random number generators also provides resilience and redundancy in case of a failure of one or more of the random number generators. In some implementations, multiple random number generators may be provided in client device 105 and/or server device 110, may be separate from client device 105 and/or server device 110 and may provide random numbers to client device 105 and/or server device 110 via a secure mechanism (e.g., private links secured with encryption), may be separate from client device 105 and/or server device 110 and may not provide random numbers to client device 105 and/or server device 110, and/or the like.

Figure 1C:
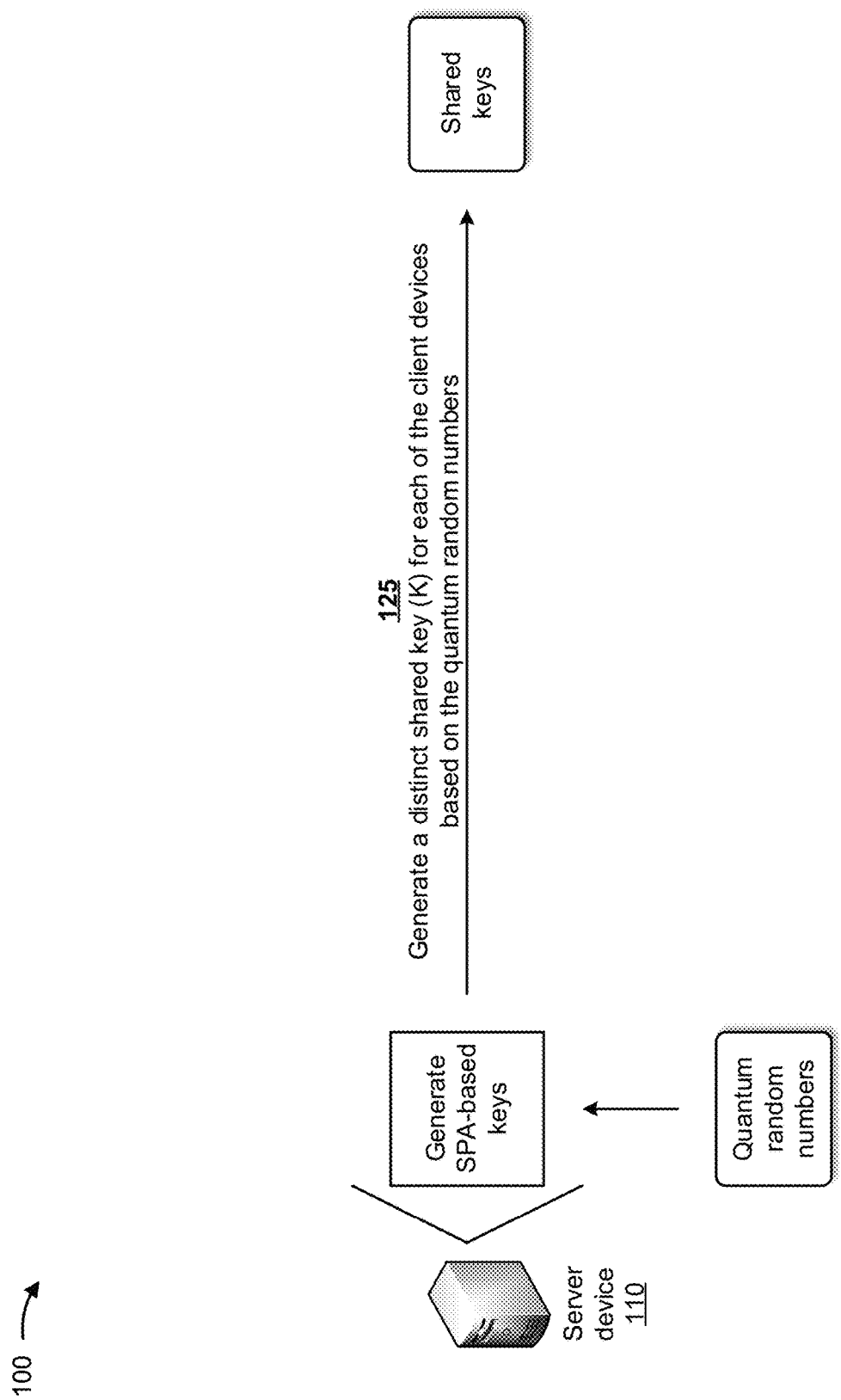

As shown in FIG. 1C, and by reference number 125, server device 110 may generate a distinct shared key (K), or more simply referred to as a shared key or a secret key, for each of client devices 105 based on random numbers (e.g., the quantum random numbers). In some implementations, the distinct shared key may include a secret distinct shared encryption key that is only known to client device 105 and server device 110. This distinct shared key may prevent vulnerability of public key handshakes between client device 105 and server device 110 by preventing post quantum computers from factoring the distinct shared key. In some implementations, server device 110 may generate a lifetime of shared keys that are unique on a per connection basis for connections between client devices 105 and server device 110. For example, as described below, a shared key is renewed by using counter, a random number generated by client device 105, and a random number generated by server device 110 to generate a new key for each session. Only client device 105 and server device 110 know how to create the new key because only client device 105 and server device 110 have access to the shared key.

In some implementations, the shared key may provide perfect forward secrecy for communications between client device 105 and server device 110. This means that even if an encrypted communication is recorded, and, at a later point a private key generated by client device 105 is compromised, the communication still cannot be decrypted. This is because a component of a secret key (e.g., a shared key) is never exposed in plain text or stored by client device 105 and/or server device 110. In some implementations, the distinct shared key may include a random string of bits created explicitly for scrambling and unscrambling data. Server device 110 may utilize hashing and/or information about client devices 105 (e.g., identifiers of client devices 105) to ensure that every shared key (Ks) is unpredictable, unique, includes a length that cannot be deciphered, and/or the like.

Figure 1D:
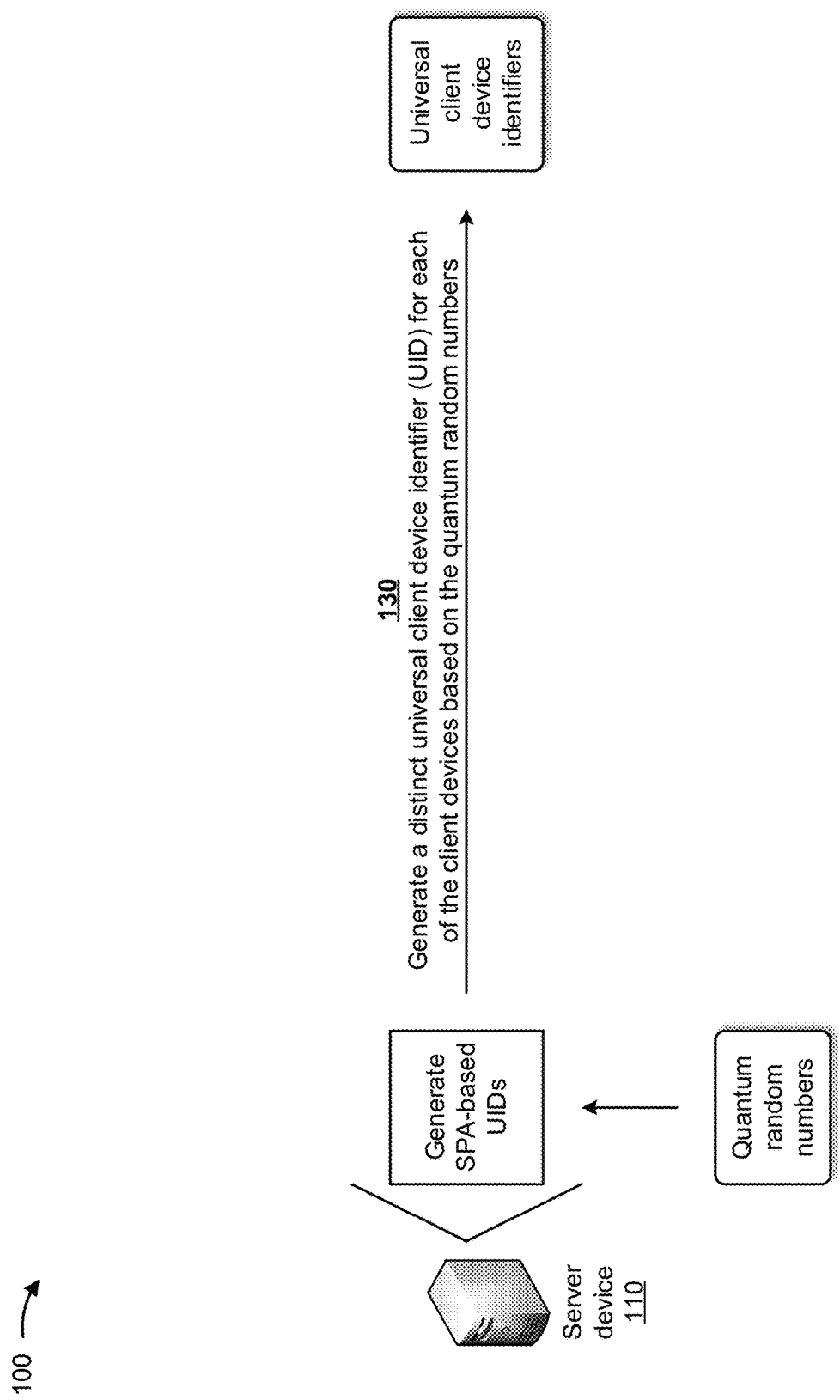

As shown in FIG. 1D, and by reference number 130, server device 110 may generate a distinct universal client device identifier (UID) for each of client devices 105 based on random numbers (e.g., the quantum random numbers). In some implementations, the distinct universal client device identifier may include a universal identifier of one of client devices 105. In some implementations, the distinct universal client device identifier may include a randomized string of bits generated explicitly for secretly identifying one of client devices 105. Server device 110 may utilize hashing and/or information about client devices 105 (e.g., identifiers of client devices 105) to ensure that every universal client device identifier is unpredictable, unique, and/or the like.

Figure 1E:
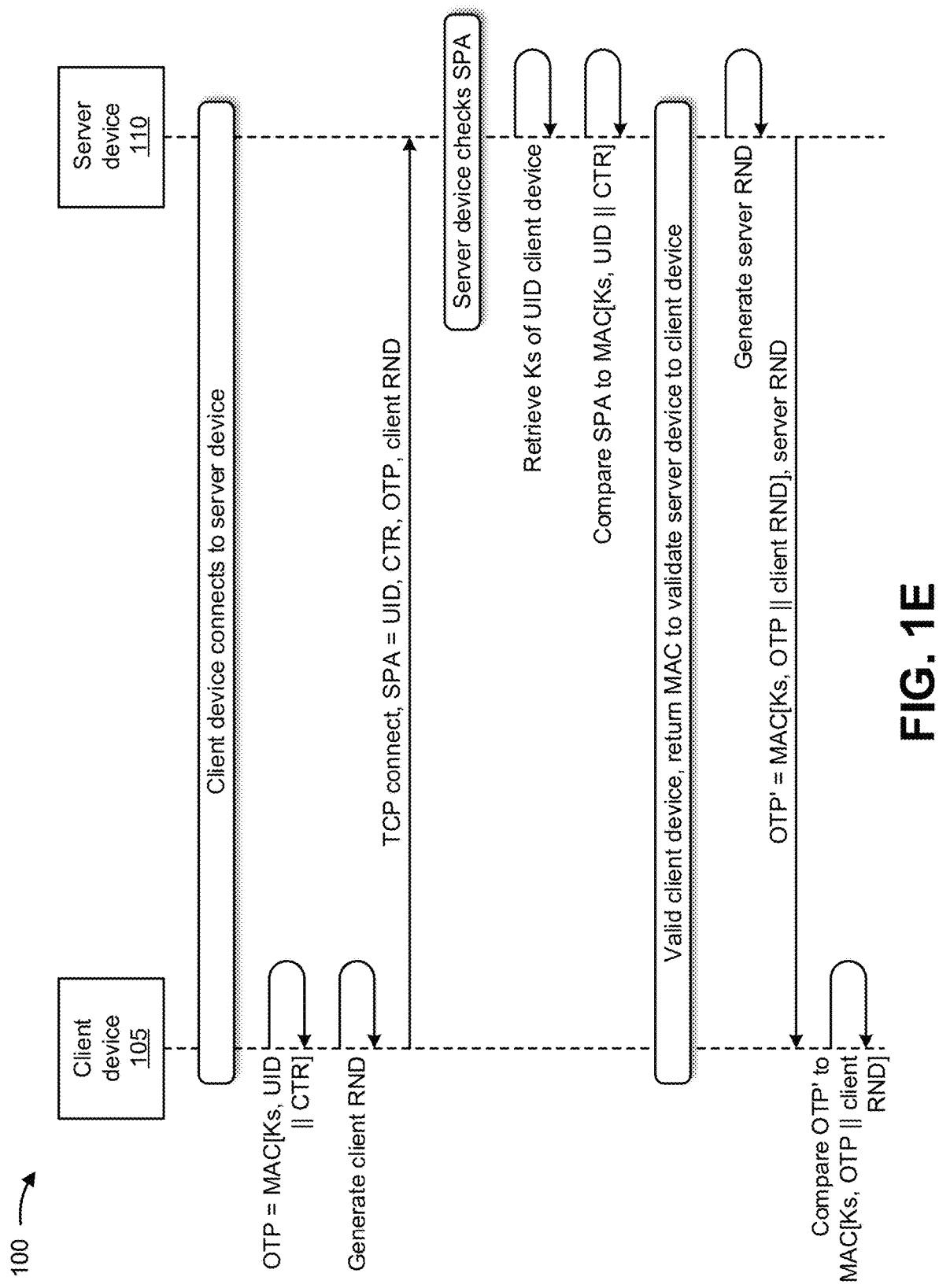
Figure 1F:
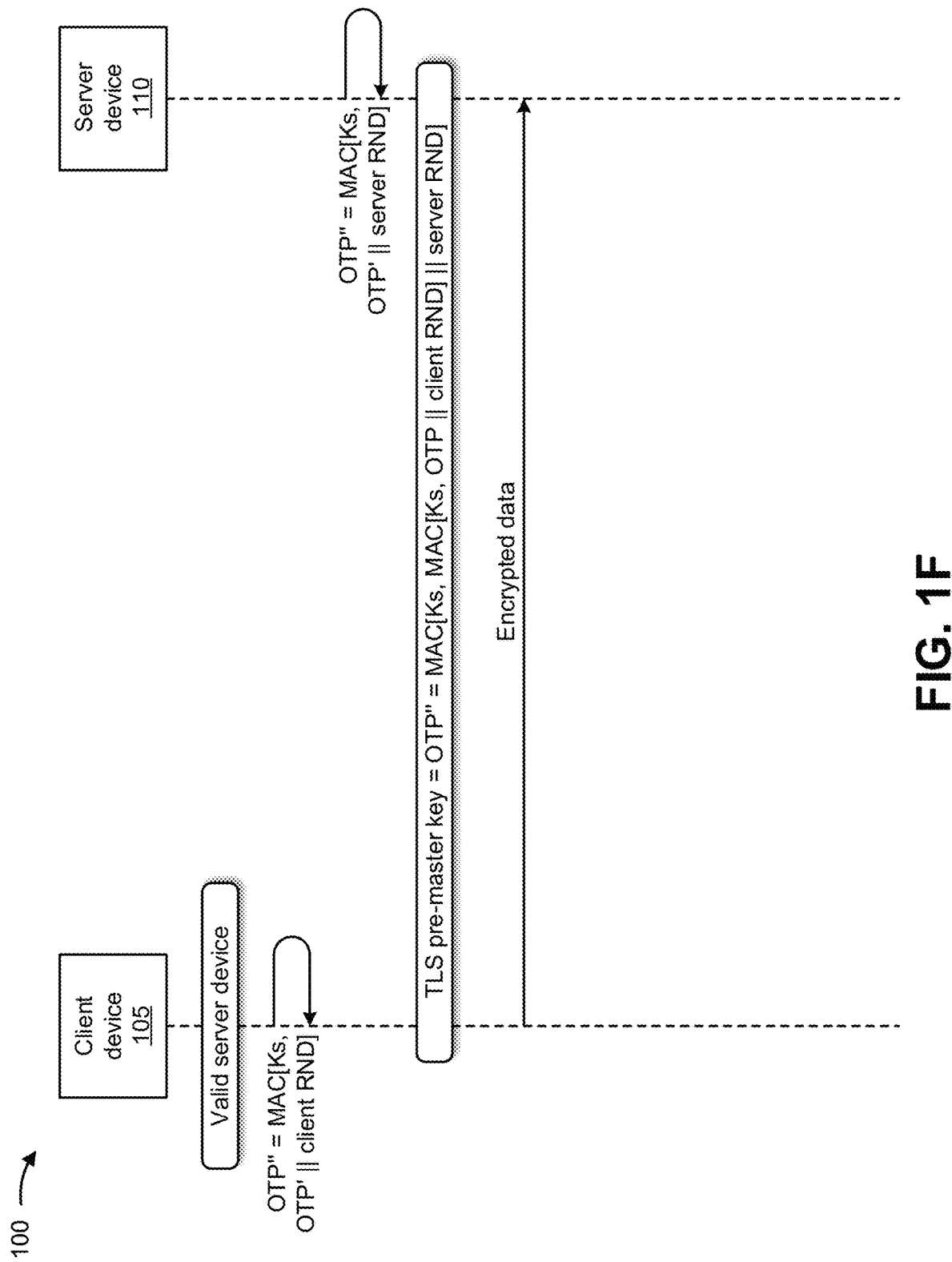

FIGS. 1E and 1F are diagrams of a control flow associated with a transport layer security (TLS) shared key. The control flow depicted in FIGS. 1E and 1F may occur after server device 110 performs the functions described above in connection with FIGS. 1A-1D. As shown in FIG. 1E, client device 105 may connect to server device 110, and may generate a first one-time password (OTP) based on a message authentication code (MAC). In one aspect, the MAC is generated based on the shared key (Ks), the universal client device identifier (UID), and a counter (CTR). Client device 105 may generate a client random number (RND).

In some implementations, the first one-time password (OTP) may include a message authentication code (e.g., a hash-based message authentication code (HMAC)) that is generated based on the shared key, the distinct universal client device identifier (UID), and the incremented counter (e.g., that is incremented by client device 105 and is mutually tracked by client device 105 and server device 110). A MAC may be generated based on a cryptographic hash function (e.g., the distinct universal client device identifier) and a secret cryptographic key (e.g., the shared key). A MAC may be used to simultaneously verify both data integrity and authenticity of a message.

In some implementations, the counter (e.g., along with the shared key, the client random number, and a random number generated by server device 110) may be utilized by client device 105 and server device 110 to generate a new key for each communication session provided between client device 105 and server device 110. In such implementations, only client device 105 and server device 110 know how to create the new key because only client device 105 and server device 110 have access to the shared key. Server device 110 may track counters associated with client devices 105 differently since each client device 105 may increment the counter differently. In some implementations, the client random (RND) may be generated by a quantum random number generator, similar to the quantum random numbers generated by server device 110.

As further shown in FIG. 1E, client device 105 may generate, and provide to server device 110, a transmission control protocol (TCP) request that includes an SPA packet. The SPA packet may include the universal client device identifier (UID), the counter (CTR), the first one-time password (OTP), and the client random number (RND). Server device 110 may check the SPA packet by retrieving the shared key (Ks) associated with the universal client device identifier (UID) (or by regenerating the shared key from the UID and the master key) and comparing the SPA packet to a comparison MAC generated based on the retrieved or generated shared key (Ks), the universal client device identifier (UID), and the counter (CTR).

If the SPA packet matches the comparison MAC, server device 110 may validate client device 105 and may provide a MAC associated with the SPA packet to client device 105 (e.g., so that client device 105 may validate server device 110). For example, server device 110 may generate a server random number (RND) (e.g., which is sent to client device 105 as plaintext) and may generate a second one-time password (OTP') based on the client RND and a MAC that is generated based on the shared key (Ks), the first one-time password (OTP), and the client RND. Server device 110 may provide the second one-time password (OTP') and the server RND to client device 105, and client device 105 may compare the second one-time password (OTP') to a MAC that is generated based on the shared key (Ks), the first one-time password (OTP), and the client RND.

As shown in FIG. 1F, client device 105 may validate server device 110 based on comparing the second one-time password (OTP') to the MAC that is generated based on the shared key (Ks), the first one-time password (OTP), and the client RND. If client device 105 validates server device 110, client device 105 may generate a third one-time password (OTP") based on a MAC that is generated based on the shared key (Ks), the second one-time password (OTP'), and the server RND. Server device 110 may also generate the third one-time password (OTP") based on the MAC that is generated based on the shared key (Ks), the second one-time password (OTP'), and the server RND.

As further shown in FIG. 1F, a TLS pre-master key may be established between client device 105 and server device 110 and may be equivalent to the third one-time password (OTP") that is generated based on a MAC that is generated based on the shared key (Ks), another MAC (e.g., generated based on the shared key (Ks), the first one-time password (OTP), and the client RND), and the server RND. Client device 105 may then utilize the TLS pre-master key to provide encrypted data to server device 110.

Figure 1G:
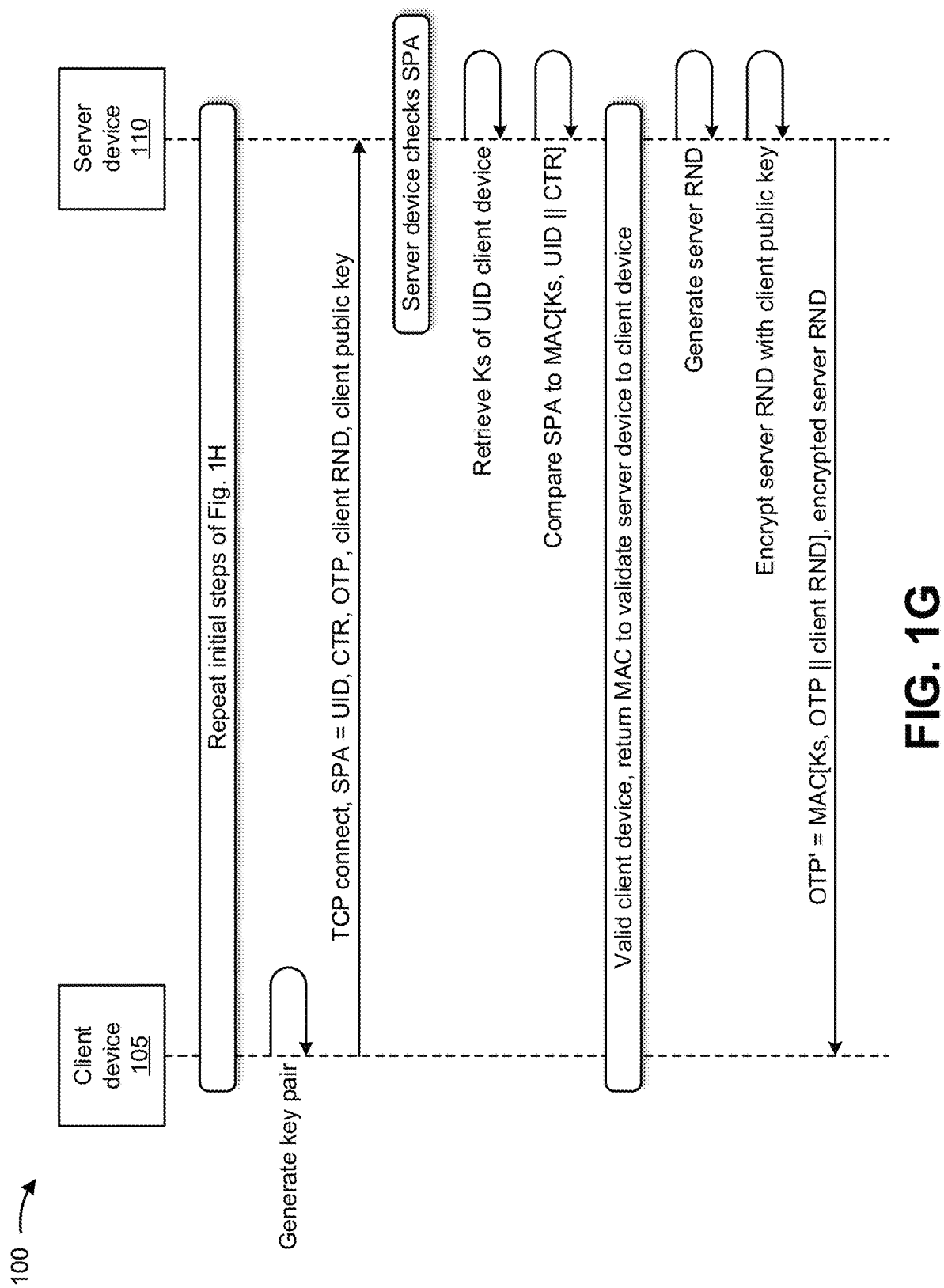
Figure 1H:
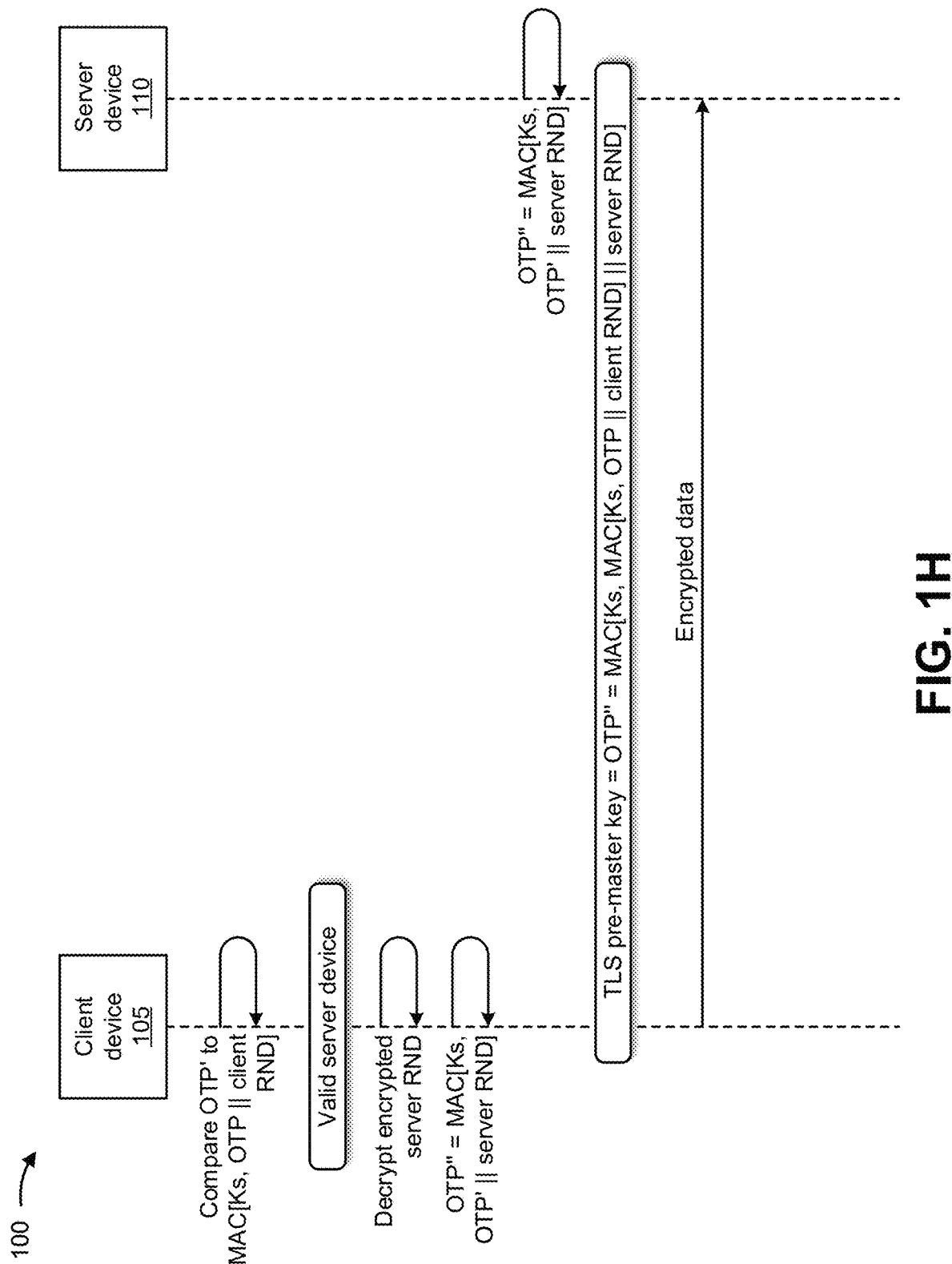

FIGS. 1G and 1H are diagrams of a control flow associated with a TLS shared key perfect forward secrecy handshake. The control flow depicted in FIGS. 1G and 1H may occur after server device 110 performs the functions described above in connection with FIGS. 1A-1D. As shown in FIG. 1G, the initial steps of the control flow shown in FIG. 1E (e.g., up until and including generation of the client random number (RND)) may be performed as described above. Client device 105 may generate a key pair that includes a client public key. Client device 105 may generate, and provide to server device 110, a transmission control protocol (TCP) request that includes an SPA packet. The SPA packet may include the universal client device identifier (UID), the counter (CTR), the first one-time password (OTP), the client random number (RND), and the client public key.

Server device 110 may check the SPA packet by retrieving or regenerating the shared key (Ks) associated with the universal client device identifier (UID) and comparing the SPA packet to a comparison MAC generated based on the retrieved or generated shared key (Ks), the universal client device identifier (UID), and the counter (CTR). If the SPA packet matches the comparison MAC, server device 110 may validate client device 105 and may provide a MAC associated with the SPA packet to client device 105 (e.g., so that client device 105 may validate server device 110). For example, server device 110 may generate a server random number (RND), may encrypt the server RND with the client public key, and may generate a second one-time password (OTP') based on the client RND and a MAC that is generated based on the shared key (Ks), the first one-time password (OTP), and the client RND. Server device 110 may provide the second one-time password (OTP') and the encrypted server RND to client device 105.

As shown in FIG. 1H, client device 105 may compare the second one-time password (OTP') to a MAC that is generated based on the shared key (Ks), the first one-time password (OTP), and the client RND. Client device 105 may validate server device 110 based on comparing the second one-time password (OTP') to the MAC that is generated based on the shared key (Ks), the first one-time password (OTP), and the client RND. If client device 105 validates server device 110, client device 105 may decrypt the encrypted server RND. Client device 105 may generate a third one-time password (OTP") based on a MAC that is generated based on the shared key (Ks), the second one-time password (OTP'), and the server RND. Server device 110 may also generate the third one-time password (OTP") based on the MAC that is generated based on the shared key (Ks), the second one-time password (OTP'), and the server RND.

As further shown in FIG. 1H, a TLS pre-master key may be established between client device 105 and server device 110 and may be equivalent to the third one-time password (OTP") that is generated based on a MAC that is generated based on the shared key (Ks), another MAC (e.g., generated based on the shared key (Ks), the first one-time password (OTP), and the client RND), and the server RND. Client device 105 may then utilize the TLS pre-master key to provide encrypted data to server device 110.

Figure 1I:
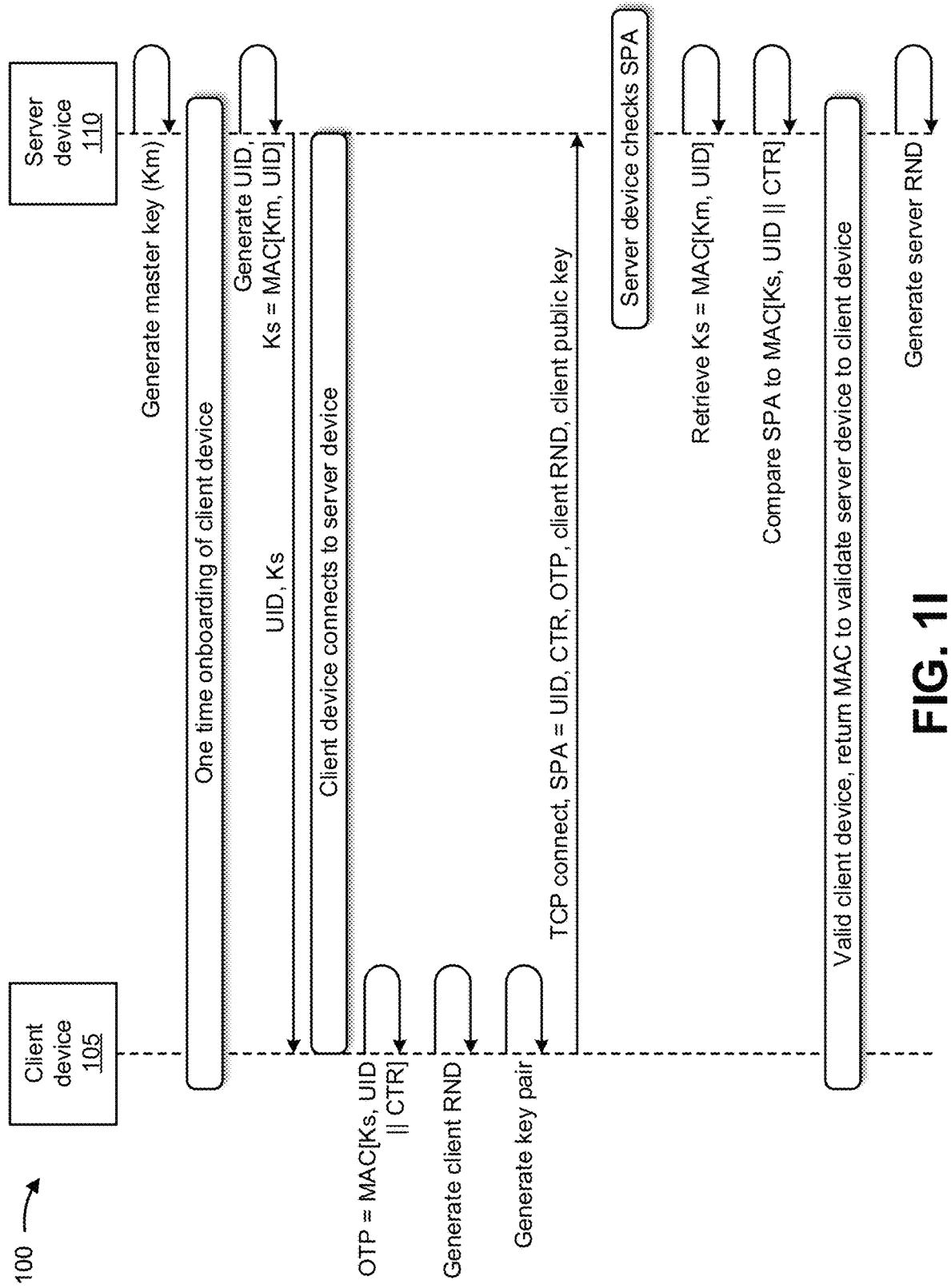
Figure 1J:
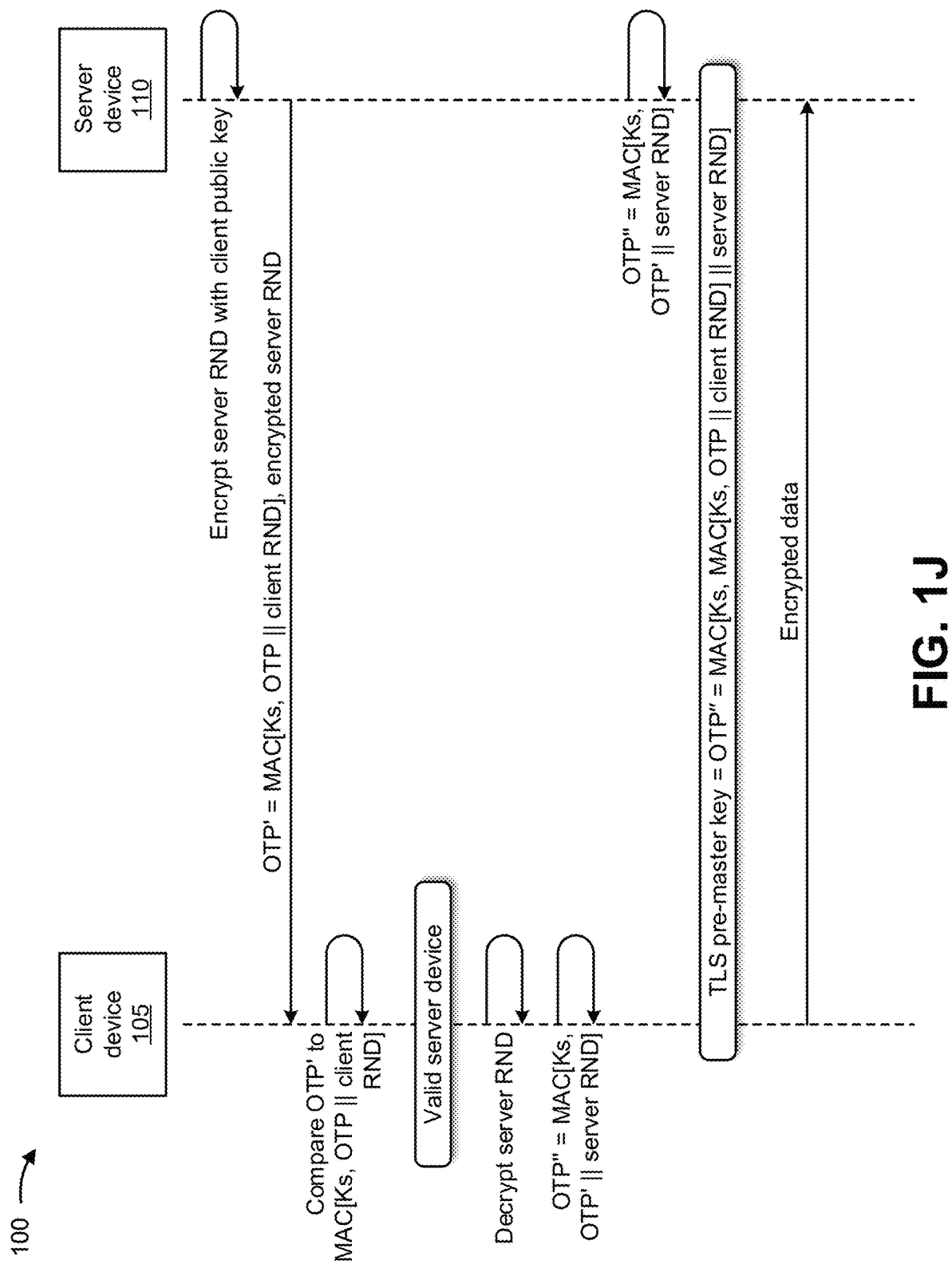

FIGS. 1I and 1J are diagrams of a control flow associated with a TLS shared key perfect forward secrecy master key handshake. The control flow depicted in FIGS. 1I and 1J may occur before and during server device 110 performs the functions described above in connection with FIGS. 1A-1D. As shown in FIG. 1I, a master key (Km) may be generated (e.g., by server device 110) and a one-time onboarding of client device 105 may occur. Server device 110 may generate the universal client device identifier (UID), and may generate the shared key (Ks) from a MAC that is generated based on the master key (Km) and the universal client device identifier (UID). Client device 105 may connect to server device 110, and may generate a first one-time password (OTP) based on a MAC that is generated based on the shared key (Ks), the universal client device identifier (UID), and the counter (CTR) associated with client device 105. Client device 105 may generate a client random number (RND), and may generate a key pair that includes a client public key.

As further shown in FIG. 1I, client device 105 may generate, and provide to server device 110, a transmission control protocol (TCP) request that includes an SPA packet. The SPA packet may include the universal client device identifier (UID), the counter (CTR), the first one-time password (OTP), the client random number (RND), and the client public key. Server device 110 may check the SPA packet by retrieving or generating the shared key (Ks) associated with the master key (Km) and the universal client device identifier (UID) and comparing the SPA packet to a comparison MAC generated based on the retrieved or generated shared key (Ks), the universal client device identifier (UID), and the counter (CTR). If the SPA packet matches the comparison MAC, server device 110 may validate client device 105 and may provide a MAC associated with the SPA packet to client device 105 (e.g., so that client device 105 may validate server device 110). Server device 110 may then generate a server random number (RND).

As shown in FIG. 1J, server device 110 may encrypt the server RND with the client public key, and may generate a second one-time password (OTP') a MAC that is generated based on the shared key (Ks), the first one-time password (OTP), and the client RND. Server device 110 may provide the second one-time password (OTP') and the encrypted server RND to client device 105. Client device 105 may compare the second one-time password (OTP') to a MAC that is generated based on the shared key (Ks), the first one-time password (OTP), and the client RND. Client device 105 may validate server device 110 based on comparing the second one-time password (OTP') to the MAC that is generated based on the shared key (Ks), the first one-time password (OTP), and the client RND. If client device 105 validates server device 110, client device 105 may decrypt the encrypted server RND, and may generate a third one-time password (OTP") based on a MAC that is generated based on the shared key (Ks), the second one-time password (OTP'), and the server RND. Server device 110 may also generate the third one-time password (OTP") based on the MAC that is generated based on the shared key (Ks), the second one-time password (OTP'), and the server RND.

As further shown in FIG. 1J, a TLS pre-master key may be established between client device 105 and server device 110 and may be equivalent to the third one-time password (OTP") that is generated based on a MAC that is generated based on the shared key (Ks), another MAC (e.g., generated based on the shared key (Ks), the first one-time password (OTP), and the client RND), and the server RND. Client device 105 may then utilize the TLS pre-master key to provide encrypted data to server device 110.

Figure 1K:
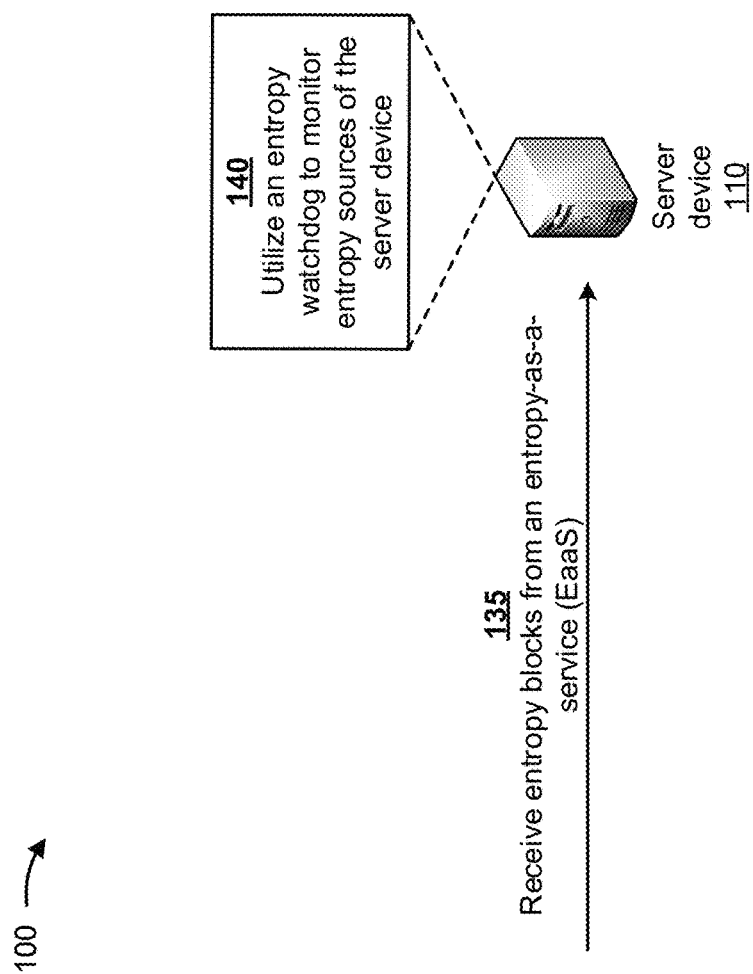

As shown in FIG. 1K, and by reference number 135, server device 110 may receive entropy blocks from an entropy-as-a-service (EaaS). In computing, entropy is a measure of randomness or unpredictability of data that is utilized to generate cryptographic keys that require random data. Entropy blocks may include seeds of high-quality entropy (e.g., high quality random data). In some implementations, the entropy blocks may include blocks that may be utilized by server device 110 to provide randomness to the shared keys, the universal client device identifiers, the second and third one-time passwords, data, and/or the like. In some implementations, server device 110 may utilize entropy blocks to enhance security of secure communications with client devices 105. In some implementations, the EaaS may provide the entropy blocks as real-time streams to server device 110. Alternatively, or additionally, server device 110 may securely store the entropy blocks for subsequent retrieval. In some implementations, server device 110 may authenticate with the EaaS, entropy blocks may be digitally signed and time-stamped, no entropy block is delivered more than once to prevent duplication, and/or the like.

EaaS provides high-quality sources of entropy to Internet of Things (IoT) devices, embedded systems, cloud service providers, client devices 105, server devices 110, and/or the like. Developers can use EaaS for seeding applications or devices with high-quality entropy and to ensure that the applications or devices are strongly protected against cyber-attacks. In some implementations, server device 110 may utilize entropy blocks of the EaaS with random numbers (e.g., quantum random numbers) to generate the shared keys, the universal client device identifiers, the second and third one-time passwords, and/or the like. In this way, server device 110 may further enhance the security of the shared keys, the universal client device identifiers, the second and third one-time passwords, and/or the like.

As further shown in FIG. 1K, and by reference number 140, server device 110 may utilize an entropy watchdog service to monitor entropy sources of server device 110. In some implementations, server device 110 may be associated with entropy sources that provide entropy blocks for communications associated with server device 110. In some implementations, the entropy watchdog service may monitor the entropy sources of service device 110 for signs of entropy exhaustion. In some implementations, the entropy watchdog service may allocate entropy from the EaaS as a secondary entropy source (e.g., when the entropy sources are experiencing entropy exhaustion). The entropy watchdog service may monitor the entropy sources of service device 110 for continuous high-quality output with ongoing randomness. If the entropy watchdog service detects that a particular entropy source exhibits compromised randomness or low output volumes, the entropy watchdog service can cause server device 110 to switch to another entropy source, may provide an alarm notification to server device 110, and/or the like.

Although implementations are described herein with reference to utilizing TCP as a way the initial SPA is provided from client device 105 to server device 110, in some implementations, other protocols may be utilized, such as a user datagram protocol (UDP), a wireless protocol, and any other protocol that transports data.

In some implementations, the use of the counter defeats a replay attack. Alternatively, a timestamp (e.g., of a current time and/or date) may be utilized to prevent a replay attack. This may be more efficient in that server device 110 does not have to look up a previous counter value of client device 105 in a database. However, preventing a replay attack may not totally be required because even with a replay attack, if the malicious party does not have the shared key (Ks), then the malicious party cannot generate the third OTP which is the TLS pre-shared key. The value of preventing a replay attack is purely to defeat a potential DoS attack that makes server device 110 think that the malicious party is utilizing a legitimate client device 105 and, therefore, generating the second SPA. However, something must change with every SPA. That is, the client device 105 cannot just send the MAC of the UID every time. Rather, client device 105 may generate a second client RND to use on the first SPA and then send that client RND to server device 110.

In this way, an SPA protocol, which may be enhanced by a quantum-driven entropy source, provides a secure end-to-end cryptographic system for client devices 105 and server devices 110. The SPA protocol enables server device 110 to definitively authenticate a client device 105 attempting to connect to server device 110. Server device 110 may derive random numbers needed from a scaled, resilient, and redundant group of quantum random number generators that deliver the random numbers via a secure, authenticated EaaS network or a local system. Client device 105 and/or server device 110 may have access to the EaaS for strong cryptography or may rely upon other entropy sources. The SPA protocol may be readily applied to a software defined perimeter (SDP) architecture, which is a dedicated and highly secure system that includes additional on-boarding procedures designed to distribute and secure material needed to construct the SPA packet (e.g., invoked prior to a TLS connection).

Thus, the SPA protocol eliminates the depletion of randomness of server device 110 by a malicious party, via client device 105 attempting to establish an infinite number of connections, since failed authentications never require entropy. The SPA protocol will also prevent a quantum computer from attempting to decipher public keys using Shor's algorithm. Finally, the SPA protocol provides perfect forward secrecy, which means that if an encrypted communication is recorded, and, at a later point a client encryption key is compromised, the communication still cannot be decrypted. The SPA protocol enables this because a component of the pre-master key is never exposed in plain text or stored.

In this way, several different stages of the process for utilizing quantum entropy in SPA for secure network connections are automated, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes quantum entropy in SPA for secure network connections in the manner described herein. Finally, the process for utilizing quantum entropy in SPA for secure network connections conserves computing resources, networking resources, and/or the like that would otherwise be wasted in monitoring network security issues, correcting network security issues discovered during monitoring, handling loss of data or network inoperability due to the network security issues, and/or the like.

Furthermore, implementations described herein may provide secure communications for entities, such as government agencies, enterprises, financial entities (e.g., banks or trading houses), and/or the like, that require superior network security with internal communications as well as with remote access from mobile devices to critical computing resources provided by the entities. The quantum-driven SPA protocol and packets may replace of the TLS handshakes and may protect confidential information of entities adopting the SPA protocol and packets. The quantum-driven SPA protocol and packets also provide better security to entities for which a data breach or hacker attack would result in high remediation costs, brand embarrassment, actual financial damages, actual security damages, and/or the like.

As indicated above, FIGS. 1A-1K are provided merely as examples. Other examples may differ from what was described with regard to FIGS. 1A-1K. The number and arrangement of devices and networks shown in FIGS. 1A-1K are provided as an example. In practice, there may be additional devices and/or networks, fewer devices and/or networks, different devices and/or networks, or differently arranged devices and/or networks than those shown in FIGS. 1A-1K. Furthermore, two or more devices shown in FIGS. 1A-1K may be implemented within a single device, or a single device shown in FIGS. 1A-1K may be implemented as multiple, distributed devices. Additionally, or alternatively, a set of devices (e.g., one or more devices) of FIGS. 1A-1K may perform one or more functions described as being performed by another set of devices of FIGS. 1A-1K.

Figure 2:
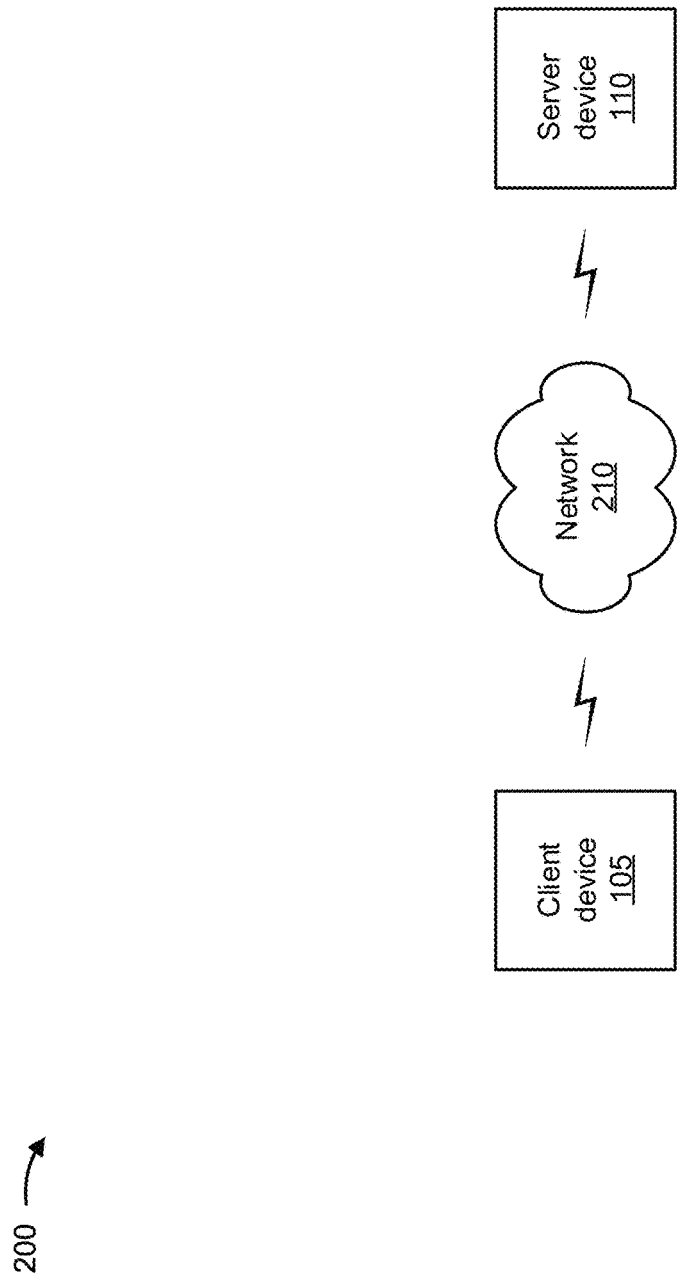
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include client device 105, server device 110, and a network 210. Devices of environment 200 may interconnect via wired connections, wireless connections, or a combination of wired and wireless connections.

Client device 105 includes one or more devices capable of receiving, generating, storing, processing, and/or providing information, such as information described herein. For example, client device 105 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like) or a similar type of device. In some implementations, client device 105 may receive information from and/or transmit information to server device 110.

Server device 110 includes one or more devices capable of receiving, generating, storing, processing, and/or providing information, as described herein. For example, server device 110 may include a laptop computer, a tablet computer, a desktop computer, a group of server devices, or a similar type of device, associated with an entity the requires secure connections with client devices 105. In some implementations, server device 110 may receive information from and/or transmit information to client device 105.

In some implementations, server device 110 may be designed to be modular such that certain software components may be swapped in or out depending on a particular need. As such, server device 110 may be easily and/or quickly reconfigured for different uses. In some implementations, server device 110 may be hosted in a cloud computing environment, may not be cloud-based (i.e., may be implemented outside of a cloud computing environment), or may be partially cloud-based.

Network 210 includes one or more wired and/or wireless networks. For example, network 210 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. In some implementations, network 210 may receive information from and/or transmit information to client device 105 and/or server device 110.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of example components of a device 300. Device 300 may correspond to client device 105 and/or server device 110. In some implementations, client device 105 and/or server device 110 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for utilizing quantum entropy in SPA for secure network connections. In some implementations, one or more process blocks of FIG. 4 may be performed by a device (e.g., server device 110). In some implementations, one or more process blocks of FIG. 4 may be performed by another device or a group of devices separate from or including the device, such as a client device (e.g., client device 105).

As shown in FIG. 4, process 400 may include receiving, from a client device, a transmission control protocol request with a single packet authorization (SPA) packet that includes data identifying a universal client device identifier, a counter, a first one-time password generated based on a first shared key, and a client random number (block 410). For example, the device (e.g., using processor 320, communication interface 370, and/or the like) may receive, from a client device, a transmission control protocol request with a single packet authorization (SPA) packet that includes data identifying a universal client device identifier, a counter, a first one-time password generated based on a first shared key, and a client random number, as described above.

As further shown in FIG. 4, process 400 may include generating a second shared key associated with the universal client device identifier (block 420). For example, the device (e.g., using processor 320, memory 330, and/or the like) may generate a second shared key associated with the universal client device identifier, as described above.

As further shown in FIG. 4, process 400 may include comparing the SPA packet to a comparison message authentication code (MAC) generated based on the second shared key, the universal client device identifier, and the counter (block 430). For example, the device (e.g., using processor 320, storage component 340, and/or the like) may compare the SPA packet to a comparison message authentication code (MAC) generated based on the second shared key, the universal client device identifier, and the counter, as described above.

As further shown in FIG. 4, process 400 may include determining whether the SPA packet matches the comparison MAC (block 440). For example, the device (e.g., using processor 320, memory 330, storage component 340, and/or the like) may determine whether the SPA packet matches the comparison MAC, as described above.

As further shown in FIG. 4, process 400 may include validating the client device when the SPA packet matches the comparison MAC (block 450). For example, the device (e.g., using processor 320, memory 330, and/or the like) may validate the client device when the SPA packet matches the comparison MAC, as described above.

As further shown in FIG. 4, process 400 may include providing, when the client device is validated, a MAC associated with the SPA packet to the client device to enable the client device to validate the device for a secure communication (block 460). For example, the device (e.g., using processor 320, memory 330, storage component 340, communication interface 370, and/or the like) may provide, when the client device is validated, a MAC associated with the SPA packet to the client device to enable the client device to validate the device for a secure communication, as described above.

In some implementations, providing the MAC associated with the SPA packet to the client device may include generating a server random number; generating a second one-time password based on the server random number and a MAC that is generated based on the first shared key, the first one-time password, and the client random number; and providing the second one-time password to the client device to enable the client device to validate the device for the secure communication. The second one-time password may cause the client device to compare the second one-time password to a MAC that is generated based on the first shared key, the first one-time password, and the client random number.

Process 400 may include additional implementations, such as any single implementation or any combination of implementations described below and/or in connection with one or more other processes described elsewhere herein.

In some implementations, process 400 may include generating each of the client random number and the server random number using a quantum random number generator.

In some implementations, process 400 may include generating a third one-time password based on a MAC that is generated based on the first shared key, the second one-time password, and the server random number; establishing a pre-master key with the client device based on a MAC that is equivalent to the third one-time password; and exchanging encrypted data with the client device based on the pre-master key.

In some implementations, process 400 may include receiving an entropy block from an entropy-as-a-service, wherein the device may utilize the entropy block to modify security of the secure communication.

In some implementations, process 400 includes monitoring entropy sources associated with the device, wherein the device may utilize the entropy sources to enhance security of the secure communication with the client device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a device and from a client device, a request with a single packet authorization (SPA) packet that includes data identifying a universal client device identifier;
    generating, by the device, a shared key associated with the universal client device identifier;
    determining, by the device, that the SPA packet matches a comparison message authentication code (MAC) generated based on the shared key; and
    providing, by the device and based on the SPA packet matching the comparison MAC, a MAC associated with the SPA packet to the client device to enable the client device to validate the device.

2. The method of claim 1, wherein providing the MAC associated with the SPA packet to the client device comprises:

providing a one-time password to the client device to enable the client device to validate the device.

3. The method of claim 2, wherein the one-time password causes the client device to compare the one-time password to a MAC that is generated based on a second shared key and a second one-time password.

4. The method of claim 2, further comprising:
generating a second one-time password based on a MAC that is generated based on a second shared key and the one-time password;
establishing a pre-master key with the client device based on a MAC that is equivalent to the second one-time password; and
exchanging encrypted data with the client device based on the pre-master key.

5. The method of claim 1, wherein the method further comprises:
generating a master key, and
providing the master key to the client device; and
wherein generating the shared key is based on the master key.

6. The method of claim 1, further comprising:
receiving an entropy block from an entropy-as-a-service,
wherein the device is configured to utilize the entropy block to modify security of communication with the client device.

7. The method of claim 1, further comprising:
monitoring entropy sources associated with the device,
wherein the device is configured to utilize the entropy sources to enhance security of communication with the client device.

8. A device, comprising:
one or more processors configured to:
receive, from a client device, a request with a single packet authorization (SPA) packet that includes data identifying a universal client device identifier;
generate a shared key associated with the universal client device identifier;
determine that the SPA packet matches a comparison message authentication code (MAC) generated based on the shared key; and
provide, based on the SPA packet matching the comparison MAC, a MAC associated with the SPA packet to the client device to enable the client device to validate the device.

9. The device of claim 8, wherein the one or more processors, when providing the MAC associated with the SPA packet to the client device, are configured to:
generate a server random number;
encrypt the server random number with a client public key to generate an encrypted server random number; and
provide a one-time password and the encrypted server random number to the client device to enable the client device to validate the device.

10. The device of claim 9, wherein the data further identifies a client random number, and each of the client random number and the server random number includes a quantum random number.

11. The device of claim 10, wherein the one-time password causes the client device to compare the one-time password to a MAC that is generated based on a second shared key, a second one-time password, and the client random number.

12. The device of claim 8, wherein the one or more processors are further configured to:
generate a master key, and
provide the master key to the client device; and
wherein the one or more processors, when generating the shared key, are configured to generate the shared key based on the master key.

13. The device of claim 8, wherein the one or more processors are further configured to:
receive an entropy block from an entropy-as-a-service,
wherein the device is configured to utilize the entropy block to modify security of communication with the client device.

14. The device of claim 8, wherein the one or more processors are further configured to:
monitor entropy sources associated with the device,
wherein the device is configured to utilize the entropy sources to enhance security of communication with the client device.

15. A non-transitory computer-readable medium storing instructions, the instructions comprising:
one or more instructions that, when executed by one or more processors of a device, cause the one or more processors to:
receive, from a client device, a request with a single packet authorization (SPA) packet that includes data identifying a universal client device identifier;
generate a shared key associated with the universal client device identifier;
determine that the SPA packet matches a comparison message authentication code (MAC) generated based on the shared key; and
provide, based on the SPA packet matching the comparison message, a MAC associated with the SPA packet to the client device to enable the client device to validate the device.

16. The non-transitory computer-readable medium of claim 15, wherein the one or more instructions, that cause the one or more processors to provide the MAC associated with the SPA packet to the client device, cause the one or more processors to:
generate a server random number;
encrypt the server random number with a client public key to generate an encrypted server random number; and
provide a one-time password and the encrypted server random number to the client device to enable the client device to validate the device.

17. The non-transitory computer-readable medium of claim 16, wherein the one-time password causes the client device to compare the one-time password to a MAC that is generated based on a second shared key and a second one-time password.

18. The non-transitory computer-readable medium of claim 16, wherein the instructions, when executed by the one or more processors, further cause the one or more processors to:
generate a master key, and
provide the master key to the client device; and
wherein the one or more instructions, that cause the one or more processors to generate the shared key, cause the one or more processors to generate the shared key based on the master key.

19. The non-transitory computer-readable medium of claim 15, wherein the instructions, when executed by the one or more processors, further cause the one or more processors to:
receive an entropy block from an entropy-as-a-service,
wherein the device is configured to utilize the entropy block to modify security of communication with the client device.

20. The non-transitory computer-readable medium of claim 15, wherein the instructions further, when executed by the one or more processors, further cause the one or more processors to:
 monitor entropy sources associated with the device, wherein the device is configured to utilize the entropy sources to enhance security of communication with the client device.

* * * * *